(12) United States Patent
Sumikawa et al.

(10) Patent No.: US 11,450,874 B2
(45) Date of Patent: Sep. 20, 2022

(54) FUEL CELL UNIT

(71) Applicant: TOYOTA JIDOSHA KABUSHIKI KAISHA, Toyota (JP)

(72) Inventors: Hiroki Sumikawa, Toyota (JP); Hiroyuki Sekine, Nisshin (JP); Masahiro Katayama, Seto (JP); Masahiko Morinaga, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 244 days.

(21) Appl. No.: 15/935,125

(22) Filed: Mar. 26, 2018

(65) Prior Publication Data

US 2018/0309150 A1 Oct. 25, 2018

(30) Foreign Application Priority Data

Apr. 21, 2017 (JP) .............................. JP2017-084075

(51) Int. Cl.
*H01M 8/2475* (2016.01)
*H01M 8/04* (2016.01)
(Continued)

(52) U.S. Cl.
CPC ..... *H01M 8/2475* (2013.01); *H01M 8/04953* (2016.02); *H01M 2250/20* (2013.01); *Y02T 90/40* (2013.01)

(58) Field of Classification Search
CPC .......... H01M 8/2475; H01M 8/04953; H01M 2250/20; H01M 8/02; H01M 8/0247; H01M 8/04; Y02T 90/32
(Continued)

(56) References Cited

U.S. PATENT DOCUMENTS

2002/0162694 A1* 11/2002 Iwasaki ................... B60L 58/15
   429/430
2002/0187380 A1* 12/2002 Tanaka .................. H01M 8/248
   429/425

(Continued)

FOREIGN PATENT DOCUMENTS

DE   10 2013 207 381 A1   11/2017
DE   10 2017 207 381 A1   11/2017
(Continued)

OTHER PUBLICATIONS

Related U.S. Appl. No. 15/923,061, filed Mar. 16, 2018.

*Primary Examiner* — Christian Roldan
(74) *Attorney, Agent, or Firm* — Dickinson Wright, PLLC

(57) ABSTRACT

A fuel cell unit includes a fuel cell stack, an electrical device, a harness connected to the electrical device, and a casing incorporating the fuel cell stack, the electrical device, and the harness. The casing includes a first accommodation portion, a second accommodation portion, and a partition wall provided with a first communication hole through which the harness passes, the first accommodation portion accommodating the fuel cell stack, the second accommodation portion accommodating the electrical device, the partition wall partitioning the first accommodation portion and the second accommodation portion, and the partition wall is provided with at least one second communication hole through which the first accommodation portion and the second accommodation portion communicate with each other, in addition to the first communication hole.

2 Claims, 16 Drawing Sheets

(51) Int. Cl.
*H01M 8/02* (2016.01)
*H01M 8/04858* (2016.01)

(58) Field of Classification Search
USPC .......................................... 429/116
See application file for complete search history.

(56) References Cited

U.S. PATENT DOCUMENTS

| | | | |
|---|---|---|---|
| 2007/0259254 A1* | 11/2007 | Tanaka | H01M 8/04082 |
| | | | 429/53 |
| 2010/0178575 A1 | 7/2010 | Takubo et al. | |
| 2012/0015257 A1* | 1/2012 | Arisawa | H01M 8/00 |
| | | | 429/400 |
| 2014/0090908 A1* | 4/2014 | Amano | B60L 3/003 |
| | | | 180/65.1 |
| 2015/0037702 A1 | 2/2015 | Osada et al. | |
| 2017/0334310 A1* | 11/2017 | Yokoyama | B60L 58/26 |

FOREIGN PATENT DOCUMENTS

| | | |
|---|---|---|
| JP | 2010251182 A | 11/2010 |
| JP | 2014076716 A | 5/2014 |
| JP | 2017073199 A | 4/2017 |
| WO | 2013137215 A1 | 9/2013 |

* cited by examiner

<COMPARATIVE EXAMPLE>

FUEL CELL UNIT

CROSS REFERENCE TO RELATED APPLICATIONS

The present application claims the priority based on Japanese Patent Application No. 2017-084075 filed on Apr. 21, 2017, the disclosure of which is hereby incorporated by reference in its entirety.

BACKGROUND

Field

The present disclosure relates to a fuel cell unit.

Related Art

JP 2014-076716A discloses a vehicle including a fuel cell. The fuel cell, disclosed in JP 2014-076716A, has an upper wall on which various electrical devices are attached. A unit in which the fuel cell (more specifically, a fuel cell stack) and the various electrical devices are integrated is hereinafter referred to as a fuel cell unit.

The inventors of the present application have come up with one mode a configuration of the fuel cell unit in which the fuel cell stack and the electrical device are accommodated in different chambers (accommodation units) in a single casing. The inventors have further come up with a configuration of such a fuel cell unit in which a partition wall, partitioning the chambers, is provided with a communication hole through which a harness passes to be connected to the electrical device. The inventors have found out the following disadvantage of this configuration. Specifically, hydrogen, leaked from the fuel cell stack because of some reasons, might reach the chamber accommodating the electrical device through the communication hole. Then, abnormal combustion of the hydrogen might occur, resulting in pressure rise in the chamber. As a result, even a casing with sufficient strength might be deformed. In view of the above, a technique that can prevent the casing of the fuel cell unit from deforming when the abnormal combustion of hydrogen occurs has been called for.

SUMMARY

According to one aspect of the disclosure, there is provided a fuel cell unit. This fuel cell unit includes a fuel cell stack, an electrical device, a harness connected to the electrical device, and a casing incorporating the fuel cell stack, the electrical device, and the harness. The casing includes a first accommodation portion, a second accommodation portion, and a partition wall provided with a first communication hole through which the harness passes, the first accommodation portion accommodating the fuel cell stack, the second accommodation portion accommodating the electrical device, the partition wall partitioning the first accommodation portion and the second accommodation portion, and the partition wall is provided with at least one second communication hole through which the first accommodation portion and the second accommodation portion communicate with each other, in addition to the first communication hole.

DETAILED DESCRIPTION

A. First Embodiment

Figure 1:
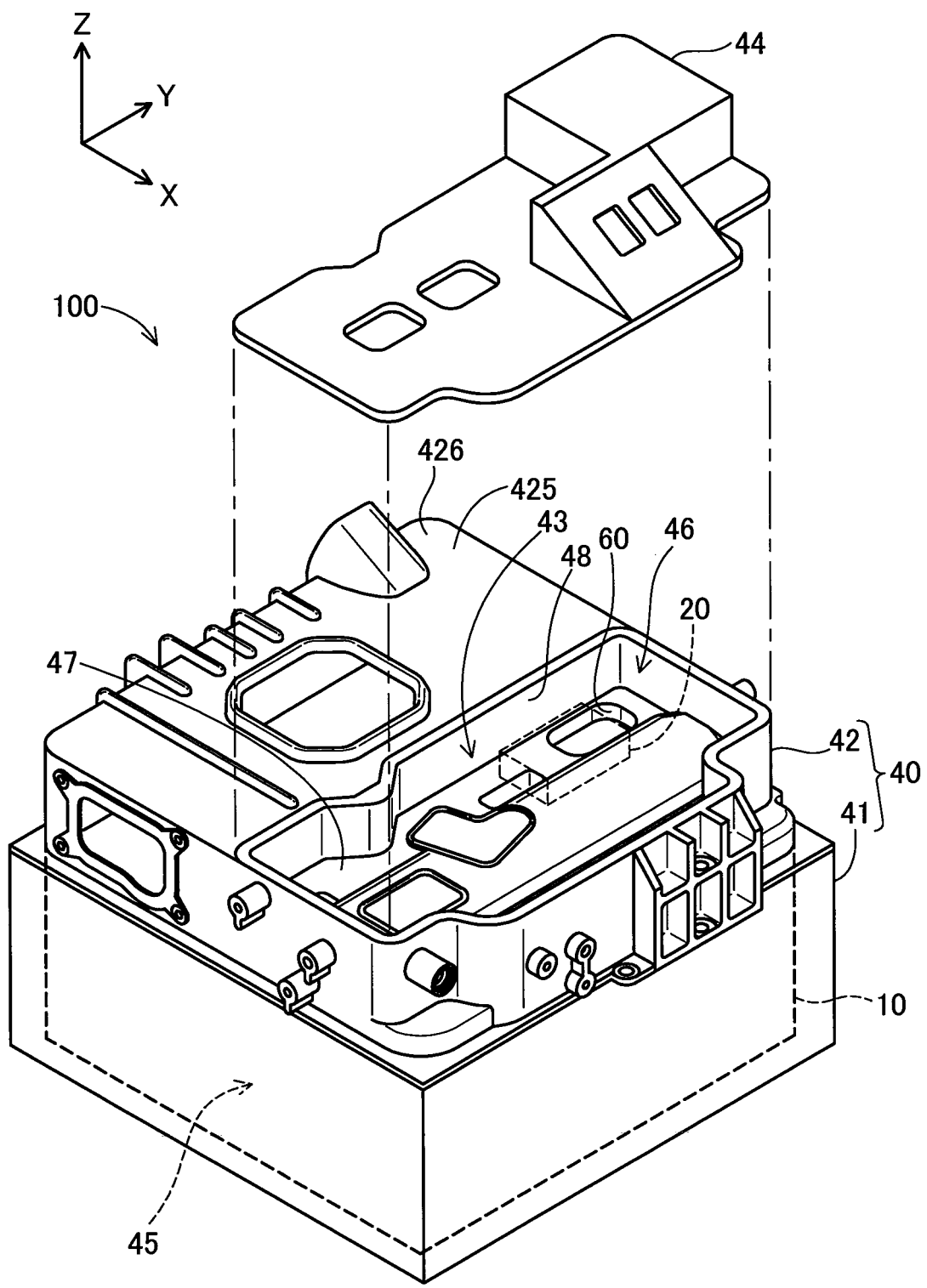
FIG. 1 is a perspective view illustrating a schematic configuration of a fuel cell unit.

FIG. 1 is a perspective view illustrating a schematic configuration of a fuel cell unit 100 according to one embodiment of the present disclosure. The fuel cell unit 100 according to the present embodiment is described as a unit to be installed in a fuel cell vehicle. In FIG. 1, three directions orthogonal to each other (an X direction, a Y direction, and a Z direction) are illustrated. The Z direction is a vertically upward direction. The X direction, orthogonal to the Z direction, is a right side direction as viewed from a driver seat in a vehicle including the fuel cell unit 100. The Y direction, orthogonal to the Z direction and the X direction, is a forward side direction as viewed from the driver seat in the vehicle including the fuel cell unit 100. Directions illustrated in FIG. 2 and after correspond to these directions illustrated in FIG. 1.

The fuel cell unit 100 includes a fuel cell stack 10, an externally power supplying unit 20 that is an electrical device, a harness 30 connected to the externally power supplying unit 20 (FIGS. 11 and 12), and a casing 40. The casing 40 incorporates the fuel cell stack 10, the externally power supplying unit 20, and the harness 30. The externally power supplying unit 20 and the harness 30 will be described in detail later.

The fuel cell stack 10 includes a plurality of fuel cells stacked. The fuel cell according to the present embodiment is a solid polymer fuel cell, and generates power upon receiving hydrogen and oxygen supplied. The fuel cell is not limited to the solid polymer fuel cell, and various types of fuel cells using hydrogen to generate power may be used.

In the present embodiment, the casing 40 includes a fuel cell stack casing 41 and an electrical device unit casing 42.

The fuel cell stack casing 41 is a substantially rectangular parallelepiped casing having an upper portion open. The fuel cell stack 10 is arranged and fixed in the fuel cell stack casing 41. The electrical device unit casing 42 is a substantially rectangular parallelepiped casing having a lower portion open. The electrical device unit casing 42 has an upper portion partially provided with a recess 43. A cover 44 is attached to cover the recess 43. In the electrical device unit casing 42, various electrical devices, such as the externally power supplying unit 20, are arranged and fixed.

The electrical device unit casing 42 is disposed on the upper portion of the fuel cell stack casing 41 and is fixed to the fuel cell stack casing 41 with bolts. The fuel cell stack casing 41 has the upper portion open and the electrical device unit casing 42 has the lower portion open. Thus, in the casing 40, the fuel cell stack casing 41 and the electrical device unit casing 42 have internal spaces in communication with each other. For example, the fuel cell stack casing 41 and the electrical device unit casing 42 may be made of aluminum or an aluminum alloy. The fuel cell stack casing 41 and the electrical device unit casing 42 may be made of other types of metal such as stainless steel.

The electrical device unit casing 42 is for accommodating a plurality of electrical devices including a high-voltage device. The high-voltage device may be any electrical device that is required to be prevented from being exposed from the casing 40, when the casing 40 is damaged due to vehicle collision or the like, for the sake of safety for example. Such a requirement may be based on various regulations, laws, or the like for example. For example, the high-voltage device may be a device that operates at a DC voltage of 60 V or higher or at an AC voltage of 30 V or higher. The high-voltage device may operate at a DC voltage of 100 V or higher. The high-voltage device may operate at a DC voltage of 300 V or lower.

The casing 40 includes a first accommodation portion 45, a second accommodation portion 46, and a partition wall 47. The first accommodation portion 45 is a space for accommodating the high-voltage device and the fuel cell stack 10 described above. In the present embodiment, the first accommodation portion 45 is provided across the internal spaces of the fuel cell stack casing 41 and the electrical device unit casing 42. The second accommodation portion 46 is a space for accommodating the high-voltage device and the externally power supplying unit 20 described above.

In the present embodiment, the second accommodation portion 46 is defined by the recess 43, formed on an upper wall 425 of the electrical device unit casing 42, and the cover 44 that covers the recess 43. The partition wall 47 is a wall that partitions the first accommodation portion 45 and the second accommodation portion 46. In the present embodiment, the partition wall 47 serves as a bottom wall of the recess 43. A portion of the upper wall 425 of the electrical device unit casing 42, not provided with the recess 43, is hereinafter referred to as a top wall 426.

Figure 2:
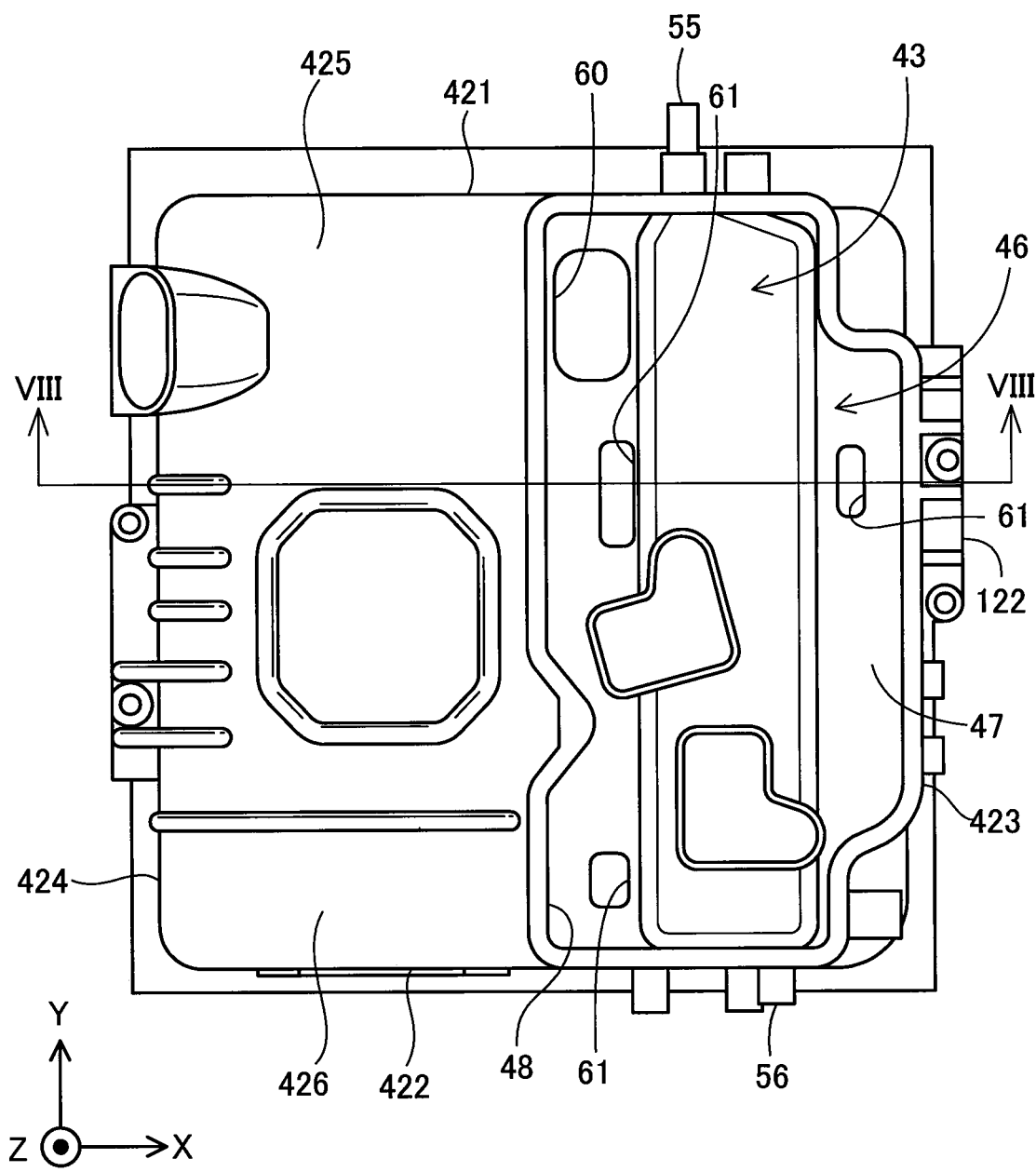
FIG. 2 is a plan view of an electrical device unit casing.
Figure 3:
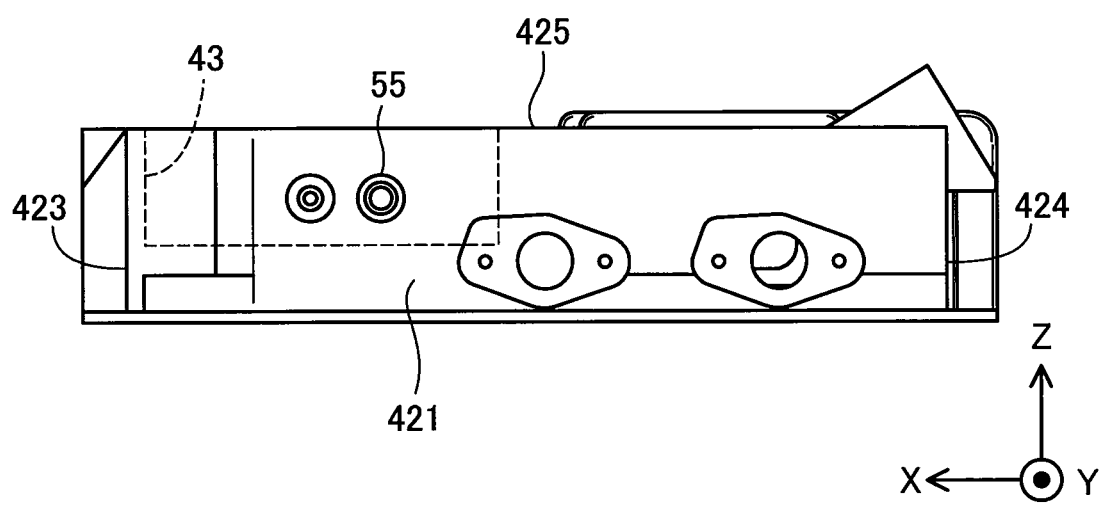
FIG. 3 is a front view of the electrical device unit casing.
Figure 4:
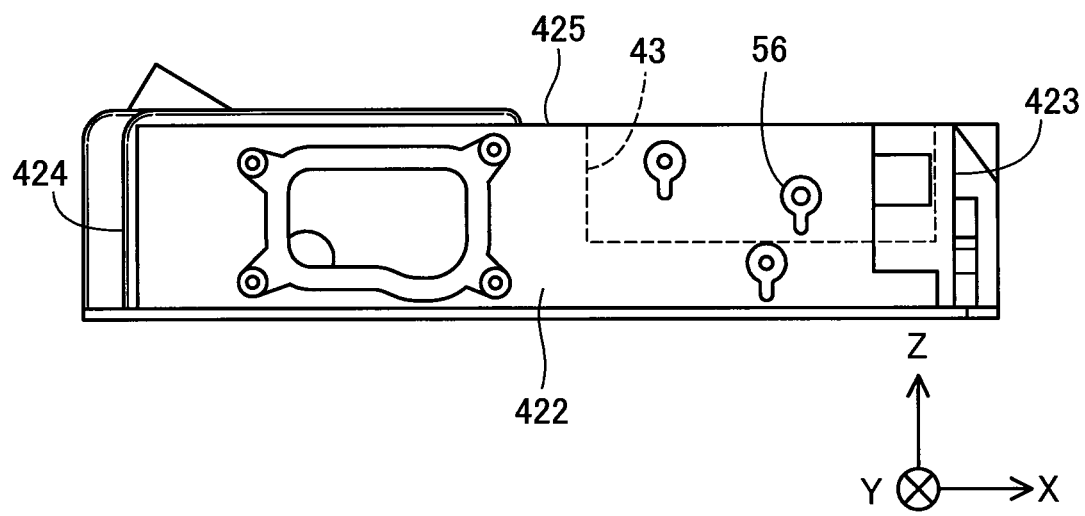
FIG. 4 is a back view of the electrical device unit casing.
Figure 5:
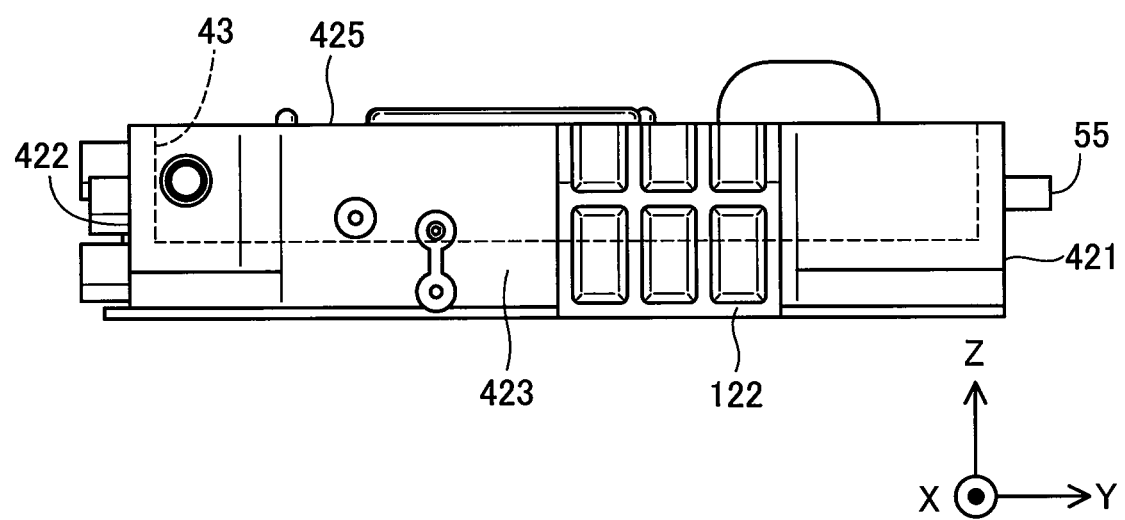
FIG. 5 is a right side view of the electrical device unit casing.
Figure 6:
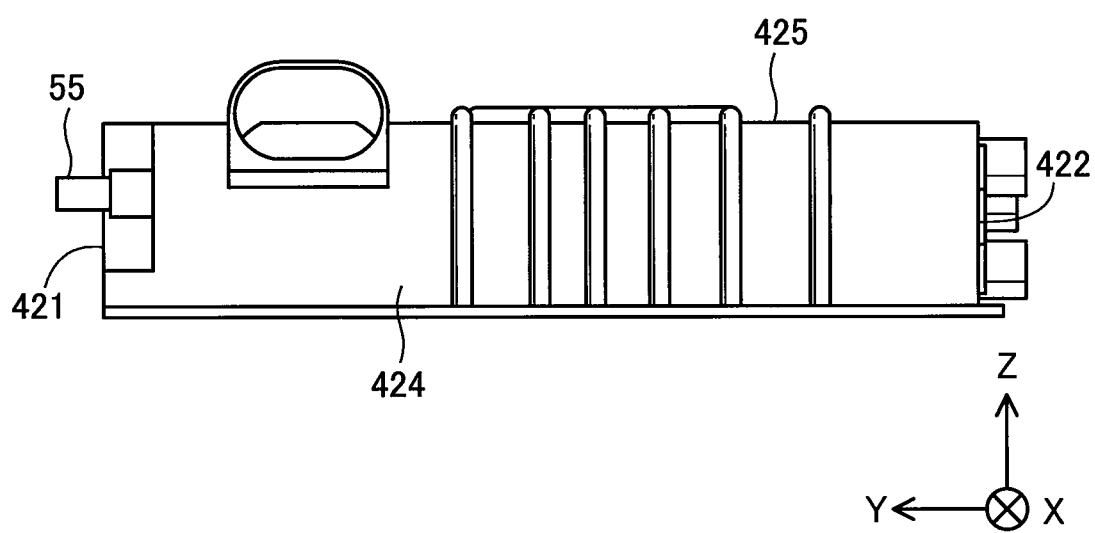
FIG. 6 is a left side view of the electrical device unit casing.
Figure 7:
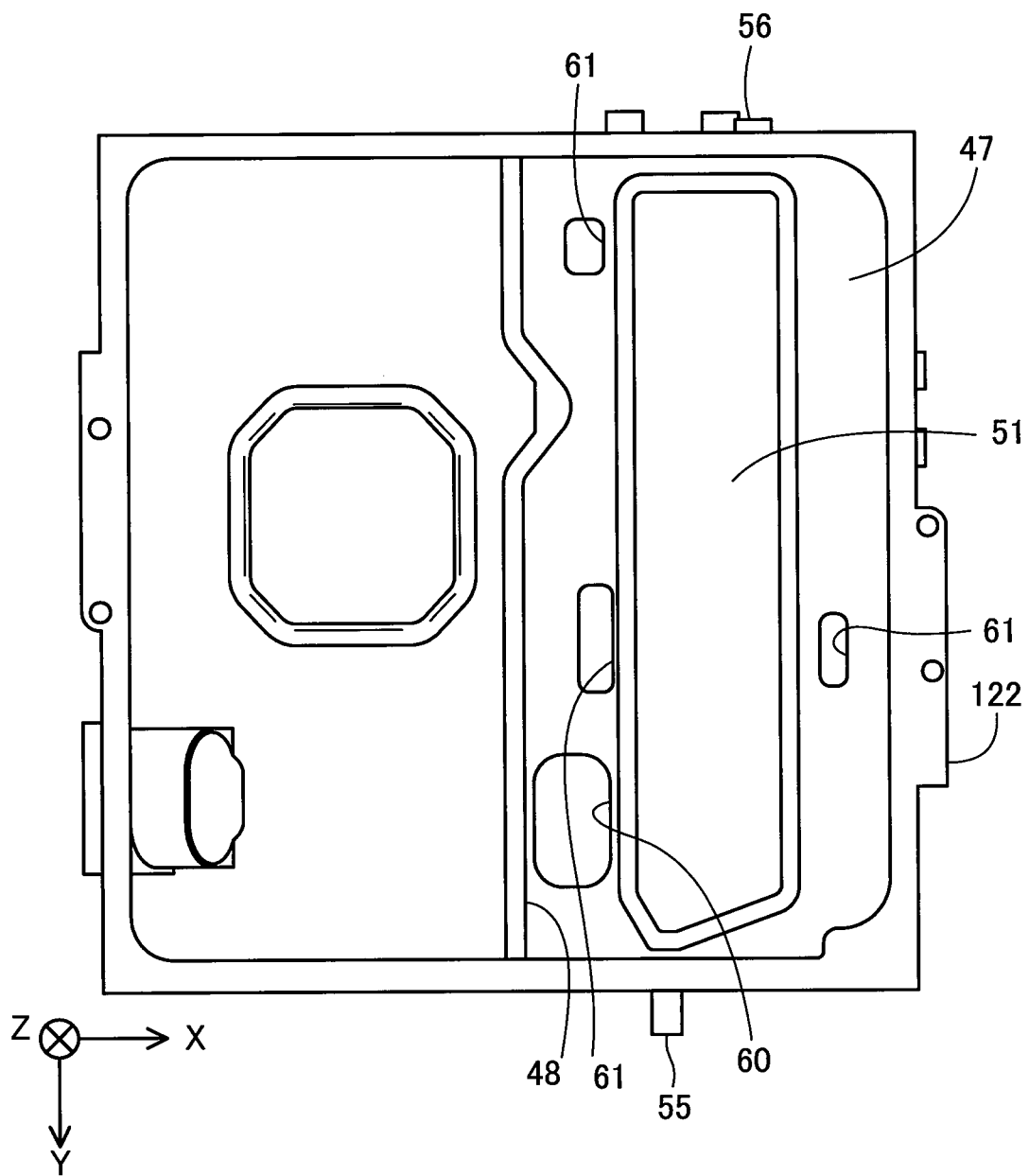
FIG. 7 is a bottom view of the electrical device unit casing.
Figure 8:
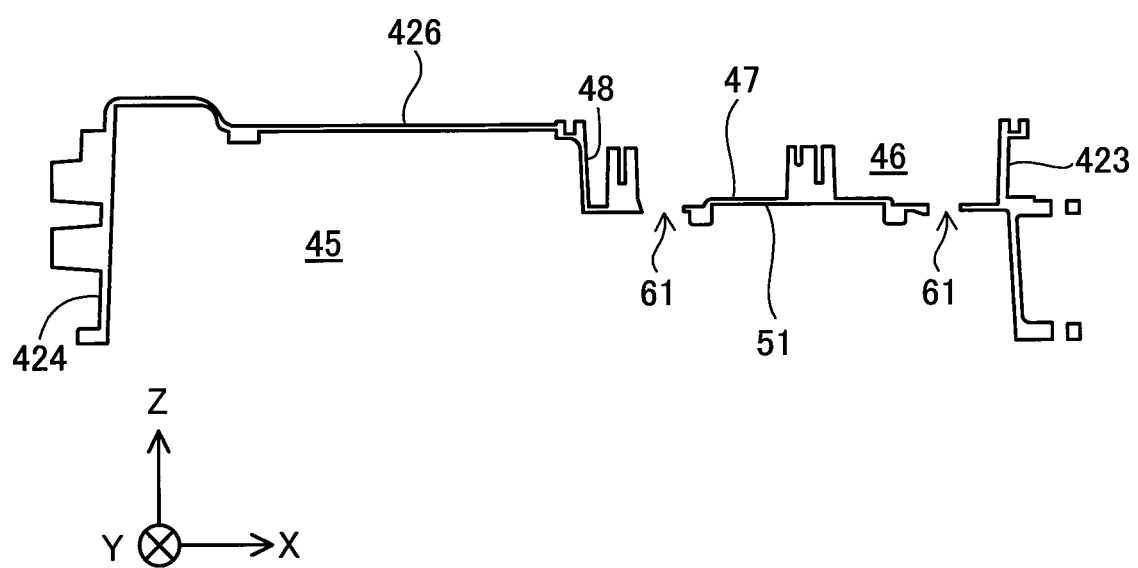
FIG. 8 is a cross-sectional view taken along line VIII-VIII in FIG. 2.

FIG. 2 is a plan view of the electrical device unit casing 42. FIG. 3 is a front view of the electrical device unit casing 42. FIG. 4 is a back view of the electrical device unit casing 42. FIG. 5 is a right side view of the electrical device unit casing 42. FIG. 6 is a left side view of the electrical device unit casing 42. FIG. 7 is a bottom view of the electrical device unit casing 42. FIG. 8 is a cross-sectional view taken along line VIII-VIII in FIG. 2.

As illustrated in FIGS. 2 to 7, the electrical device unit casing 42 includes a first side wall 421, a second side wall 422, a third side wall 423, a fourth side wall 424, and the upper wall 425. In the description below, the first side wall 421 is also referred to as a front wall 421, the second side wall 422 is also referred to as a back wall 422, the third side wall 423 is also referred to as a right side wall 423, and the fourth side wall 424 is also referred to as a left side wall 424. The first side wall 421, the second side wall 422, the third side wall 423, the fourth side wall 424, and the top wall 426 have openings. Through these openings, various harnesses are drawn to be connected to a device outside the fuel cell unit 100. Gaps between the openings and the harnesses are closed with lids and sealing members.

The first side wall 421, the second side wall 422, the third side wall 423, and the fourth side wall 424 have generally flat outer surfaces. The generally flat surface includes an entirely and completely flat surface and a surface partially including recesses and protrusions or a through hole. Thus, the generally flat surface may be a surface partially including recesses/protrusions or a through hole. This surface can still be regarded as a surface or a wall forming the outer shape of the electrical device unit casing 42. Each of the first side wall 421, the second side wall 422, the third side wall 423, and the fourth side wall 424 has a rectangular outer shape as viewed in a normal direction of the side wall.

As illustrated in FIG. 2 and FIG. 5, the right side wall 423 of the electrical device unit casing 42 according to the present embodiment is provided with a pressure receiving portion 122 including a rib, in a lattice form, protruding in the X direction. The pressure receiving portion 122 ensures the electrical device unit casing 42 to have higher resistance against impact on the right side wall. In other embodiments, the pressure receiving portion 122 may be omitted.

Figure 11:
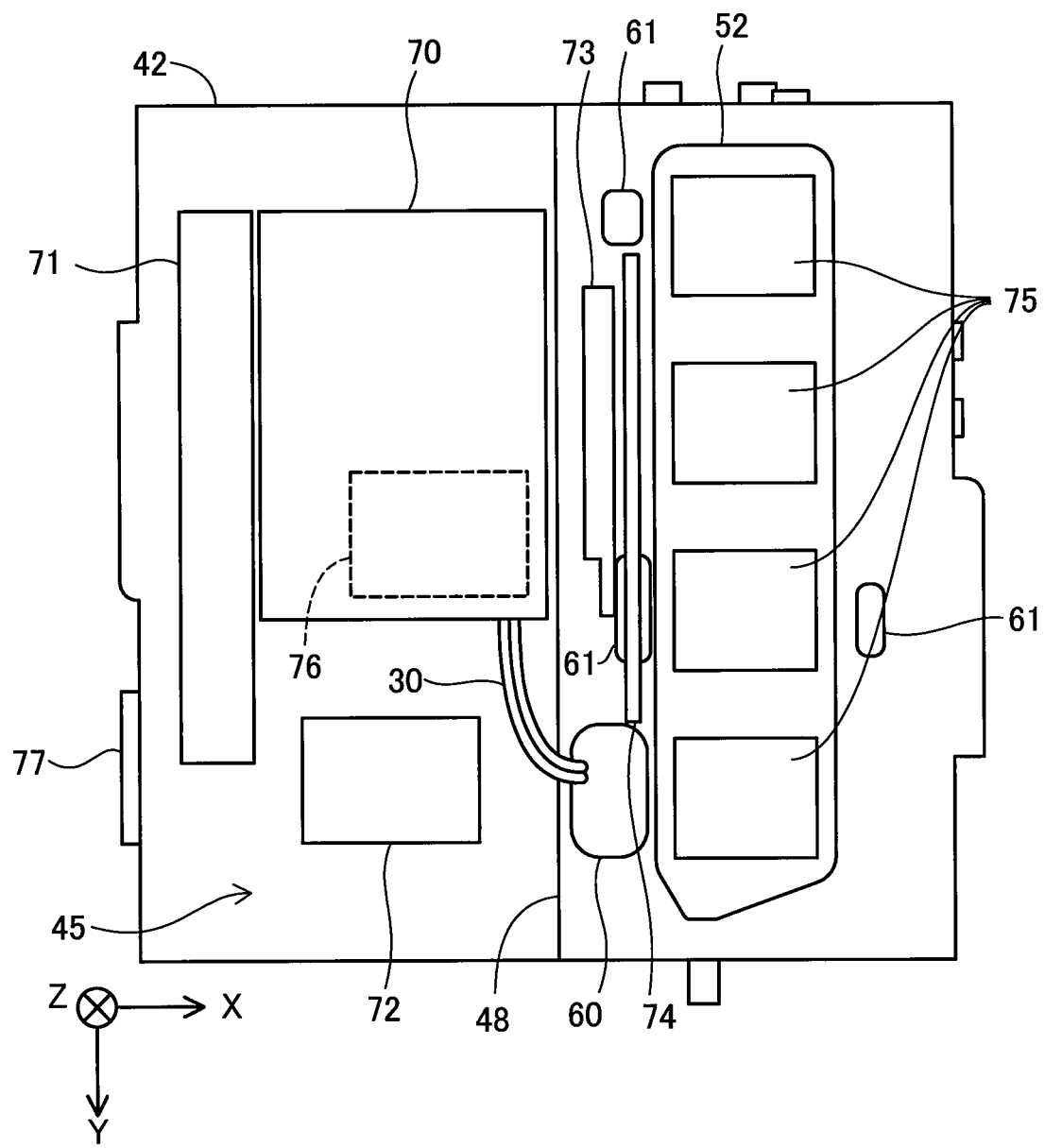
FIG. 11 is a schematic view illustrating how various electrical devices are arranged in the electrical device unit casing.
Figure 12:
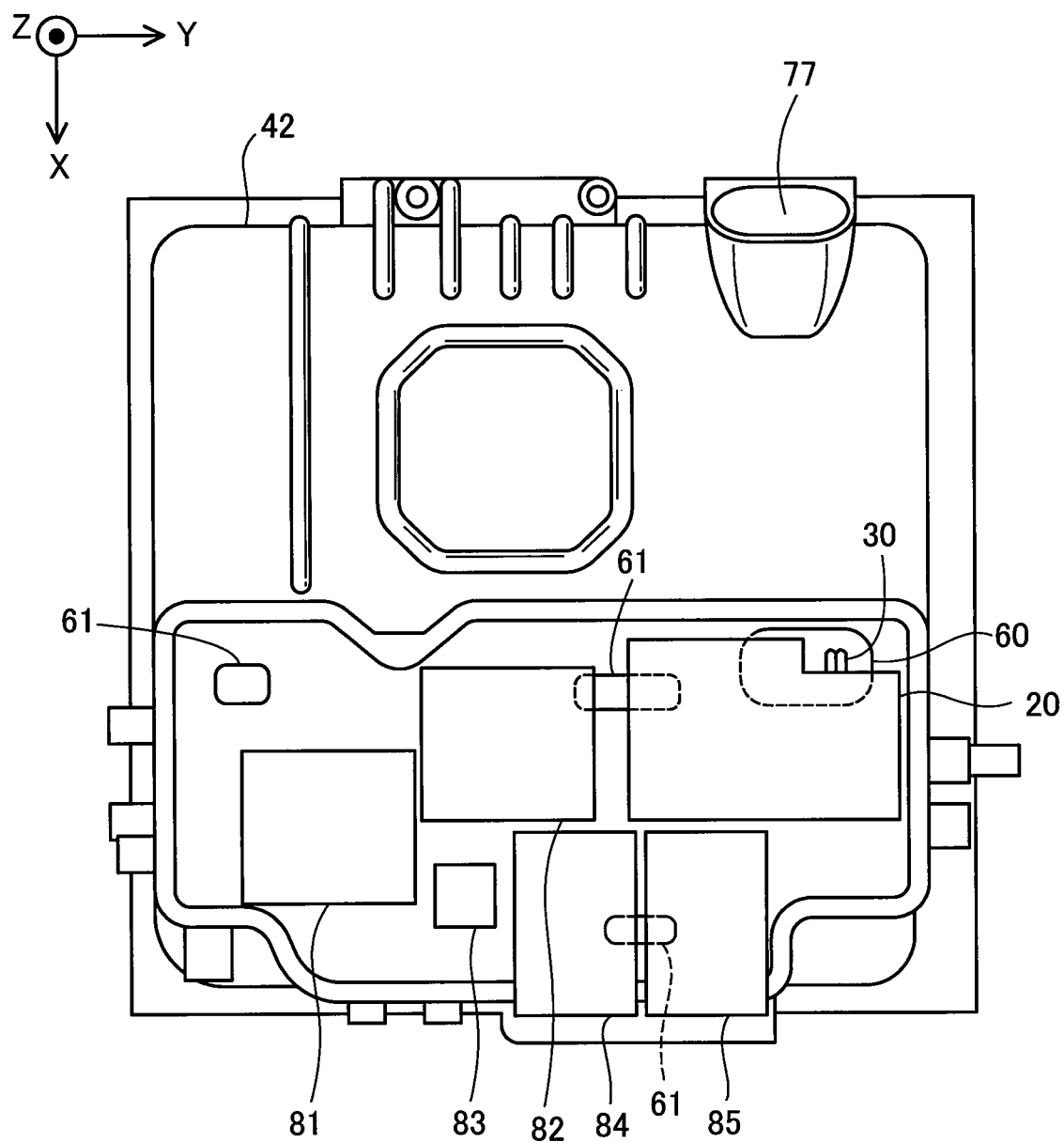
FIG. 12 is a schematic view illustrating how the various electrical devices are arranged in the electrical device unit casing.

As illustrated in FIG. 2, the partition wall 47 is provided with a single first communication hole 60 through which the harness 30 passes (FIGS. 11 and 12). In the present embodiment, the first communication hole 60 is provided on an end portion of the partition wall 47. More specifically, the first communication hole 60 is provided on an end portion of the partition wall 47 in a +Y direction and a −X direction. The partition wall 47, provided with the first communication hole 60, is further provided with a second communication hole 61 that communicates the first accommodation portion 45 and the second accommodation portion 46 with each other. Preferably, at least one second communication hole 61 is provided. In the present embodiment, three second communication holes 61 are provided. One of the three second communication holes 61 is provided on an end portion of the partition wall 47, close to the pressure receiving portion 122. The remaining two second communication holes 61 are provided on an end portion close to the center of the casing 40. Thus, in the present embodiment, a portion close to the center of the casing 40 includes a larger number of the second through holes 61 than on the end portion of the casing 40, in the partition wall 47. In the present embodiment, the two second communication holes 61 provided in an end portion of the partition wall 47 in the −X direction are positioned further on the −Y direction than the first communication hole 60. One of these two second communication holes 61 is provided on an end portion of the partition wall 47 in a −Y direction and the −X direction. In the present embodiment, a single second communication hole 61 provided in an end portion in the +X direction is provided at a position to be overlapped with the pressure receiving portion 122 in the Y direction.

As described above, the recess 43 is formed on the upper wall 425 of the electrical device unit casing 42. The partition wall 47 serves as the bottom wall of the recess 43. The recess 43 has side surfaces, in the +Y direction, the −Y direction, and the +X direction, respectively formed by inner surfaces of the first side wall 421, the second side wall 422, and the third side wall 423. The side surface of the recess 43 in the −X direction is defined by a connection wall 48 (FIG. 8) connecting the end portion of the partition wall 47 in the −X direction and the end portion of the top wall 426 in the +X direction with each other, in a vertical direction. Thus, the recess 43 is defined by the partition wall 47, the first side wall 421, the second side wall 422, the third side wall 423, and the connection wall 48.

As illustrated in FIG. 7 and FIG. 8, a depressed portion 51 that is long in the Y direction and is wide in the X direction is formed in the −Z direction (toward the fuel cell stack casing 41) of the partition wall 47. A flow path forming cover 52 (FIG. 9) is attached to the depressed portion 51 from the −Z direction side.

Figure 9:
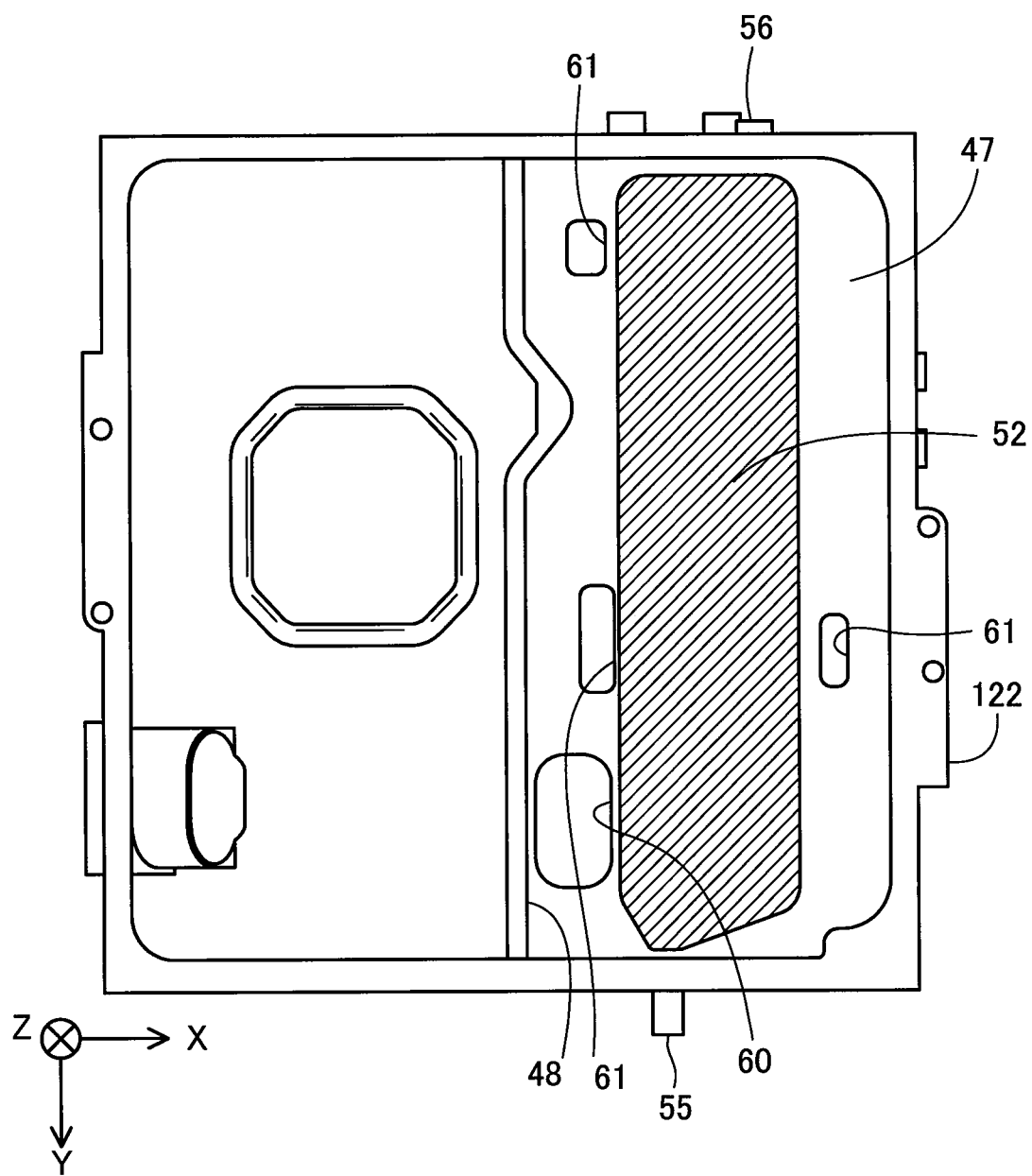
FIG. 9 is a diagram illustrating a state where a flow path forming cover is attached to a depressed portion.
Figure 10:
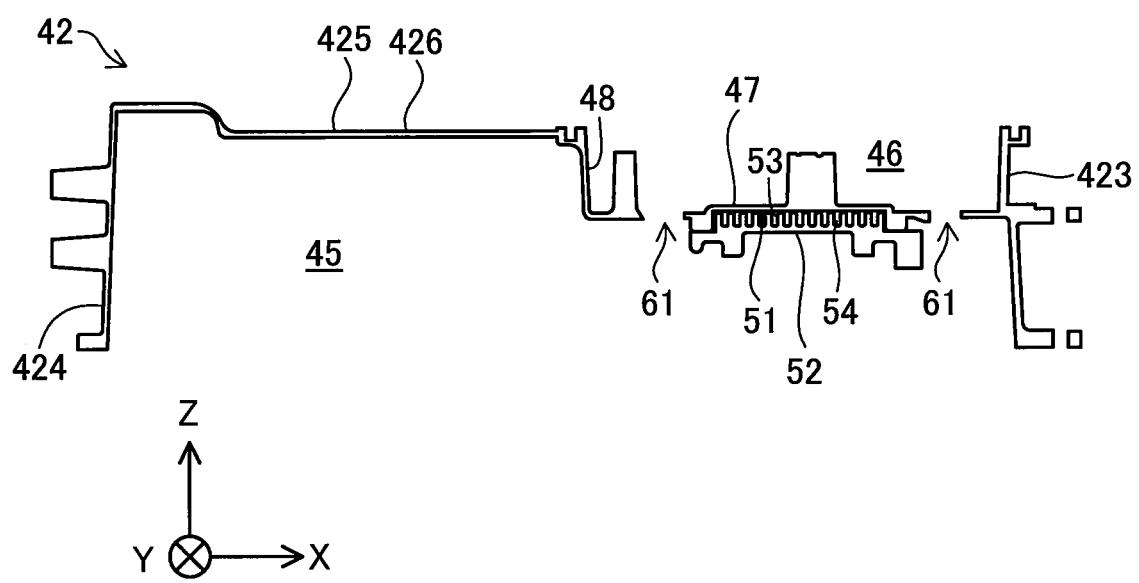
FIG. 10 is a cross-sectional view illustrating the state where the flow path forming cover is attached to the depressed portion.

FIG. 9 is a diagram illustrating a state where the flow path forming cover 52 is attached to the depressed portion 51. A hatched portion in FIG. 9 represents the flow path forming cover 52. FIG. 10 is a cross-sectional view illustrating the state where the flow path forming cover 52 is attached to the depressed portion 51. As illustrated in FIG. 10, a plurality of fins 53, extending in the Y direction, are arranged on the upper surface of the flow path forming cover 52, along the X direction. With the flow path forming cover 52 attached to the depressed portion 51, a coolant flow path 54 in which a cooling medium flows is formed on a lower surface of the partition wall 47. The first communication hole 60 and the second communication holes 61 described above are formed at positions on the partition wall 47 where the coolant flow path 54 is not formed. The cooling medium flows in the Y direction between the fins 53, in the coolant flow path 54. The first side wall 421 and the second side wall 422 are provided with openings 55 and 56 through which the cooling medium flows into the coolant flow path 54. The coolant flow path 54 is not limited to this, and the fins 53 may be omitted for example.

FIG. 11 and FIG. 12 are schematic views illustrating how various electrical devices are arranged in the electrical device unit casing 42. FIG. 11 illustrates how the electrical devices are arranged on the lower surface side of the electrical device unit casing 42, that is, in the first accommodation portion 45. FIG. 12 illustrates how the electrical devices are arranged on the upper wall side of the electrical device unit casing 42, that is, in the second accommodation portion 46.

As illustrated in FIG. 11, a power module 70, a cell monitor 71, a relay 72, a current sensor 73, a bus bar 74, and a plurality of reactors 75 are arranged on the lower surface side of the electrical device unit casing 42. The power module 70, the relay 72, and the cell monitor 71 are arranged and fixed on the lower surface of the top wall 426 of the electrical device unit casing 42. The harness 30 is connected to the power module 70, and passes through the first communication hole 60 to be connected to the externally power supplying unit 20 in the second accommodation portion 46. The current sensor 73, the bus bar 74, and the plurality of reactors 75 are arranged and fixed on the lower surface of the partition wall 47 of the electrical device unit casing 42. In the present embodiment, the reactors 75 are fixed to the flow path forming cover 52 forming the coolant flow path 54. Thus, the reactors 75 are actively cooled with the coolant flow path 54.

The cell monitor 71 is a device for monitoring voltage generated by the fuel cells in the fuel cell stack 10. The bus bar 74 receives power generated by and input from the fuel cell stack 10. The power input from the fuel cell stack 10 is supplied to the reactors 75 via the bus bar 74. The current sensor 73 detects current output from the reactors 75. The reactors 75 are each connected to the power module 70 having integrated components including a controller 76, a switching circuit, a capacitor, and the like. The power module 70 boosts the power output from the fuel cell stack 10. The power boosted by the power module 70 is supplied to a power control unit 130 (FIG. 13) via the relay 72 and a high-pressure interface 77.

As illustrated in FIG. 12, electrical devices, including the externally power supplying unit 20, two pump inverters 81 and 82, an air conditioner connector 83, a battery connector 84, and a power control unit connector 85, are disposed on the upper wall 425 of the electrical device unit casing 42, that is, on the upper surface of the partition wall 47. The battery connector 84 supplies power, supplied from a secondary battery (not illustrated), to the externally power supplying unit 20 via the relay, and to an air conditioner via the air conditioner connector 83. The power, input from the secondary battery via the battery connector 84, is also supplied to the two pump inverters 81 and 82 and is further supplied to the power control unit 130 via the power control unit connector 85. The two pump inverters 81 and 82 convert DC power, supplied from the secondary battery, into AC power, and supplies the power, as a result of the conversion, to a hydrogen pump and a water pump (neither of which is illustrated). The externally power supplying unit 20 is connected to the controller 76, incorporated in the power module 70 (FIG. 11), via the harness 30 passing through the first communication hole 60. The controller 76 controls the externally power supplying unit 20 via the harness 30. The externally power supplying unit 20 is used for supplying power generated by the fuel cell stack 10 and stored in the secondary battery, to a load device outside the vehicle as appropriate.

In the present embodiment, the coolant flow path 54 is formed on the lower surface of the partition wall 47 as described above. Thus, the two pump inverters 81, 82 and the externally power supplying unit 20 provided on the upper wall 425 of the partition wall 47 can be efficiently cooled together with the reactors 75 fixed to the lower surface of the partition wall 47.

Figure 13:
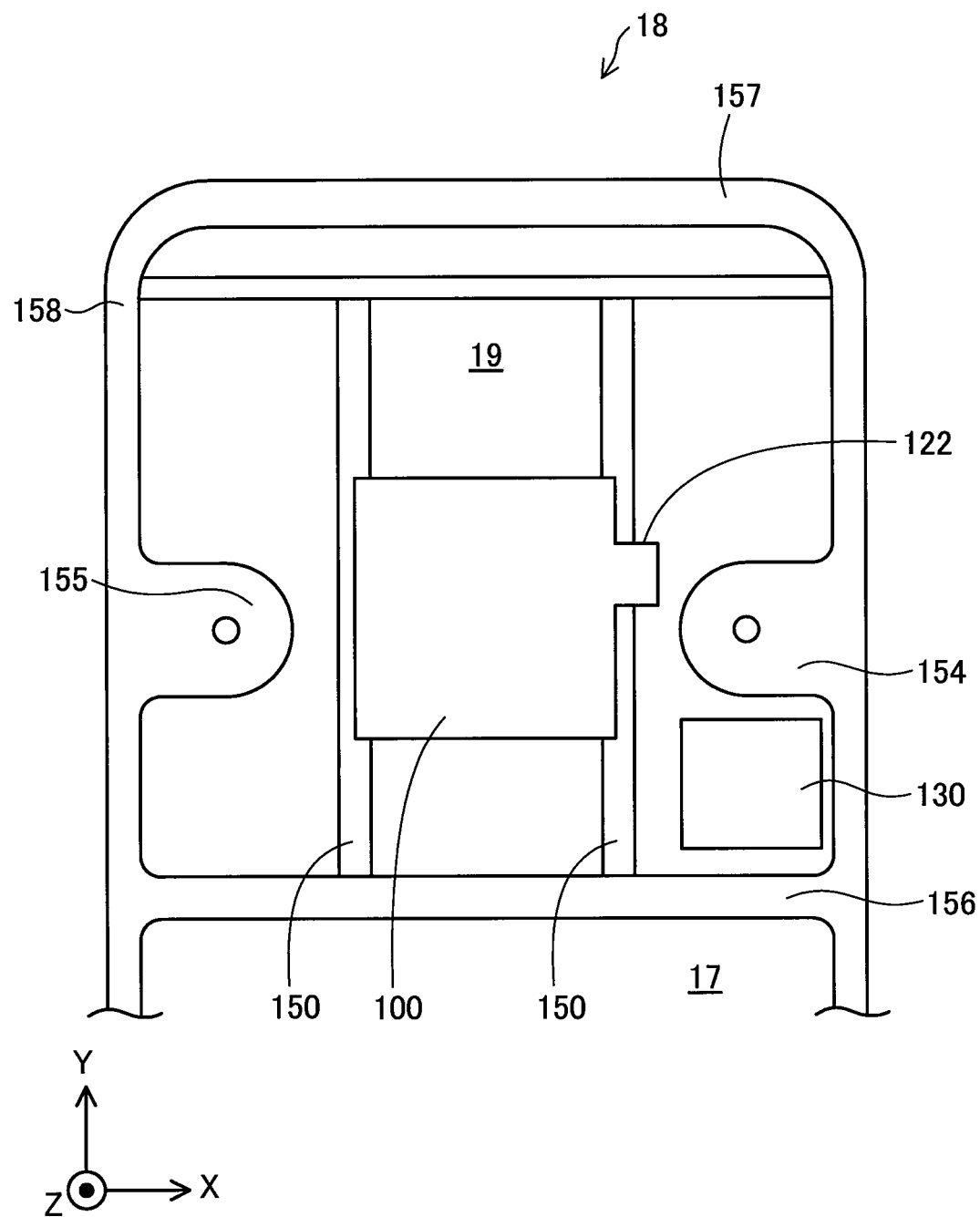
FIG. 13 is a diagram illustrating an example of how the fuel cell unit installed in a vehicle is arranged.

FIG. 13 is a diagram illustrating an example of how the fuel cell unit 100 installed in a vehicle 18 is arranged. For example, the fuel cell unit 100 installed in the vehicle 18 is arranged in a front compartment 19 of the vehicle 18 as illustrated in FIG. 13. A bumper reinforcement 157, which is a part of a body 158, is provided in front of the front compartment 19. A dash panel 156 partitions the front compartment 19 and a cabin 17 behind the front compartment 19. The front compartment 19 includes a pair of suspension towers 154 and 155 protruding upward. The pair of suspension towers 154 and 155 are disposed on the lower side of the body, and are formed to cover front suspensions supporting front wheels of the vehicle 18 and support upper end portions of the front suspensions. The power control unit 130 is arranged between the rear side of the suspension tower 154 and the dash panel 156. The power control unit 130 is supported by the suspension tower 154, the dash panel 156, and the body 158. The power control unit 130 convers the power supplied from the fuel cell unit 100, controls charging/discharging of the secondary battery, drives an air compressor for supplying air to the fuel cell stack 10, and drives a traction motor for driving the wheels.

In the front compartment 19, the fuel cell unit 100 is fixed to a pair of suspension members 150, extending in a front and rear direction of the vehicle 18, via a mount or the like. The pressure receiving portion 122 provided to the electrical device unit casing 42 of the fuel cell unit 100 faces at least a part of the suspension tower 154, which is one of the suspension towers, in the X direction, that is, in the width direction of the vehicle 18. The pressure receiving portion 122 is positioned to be overlapped with the suspension tower 154 in a horizontal direction. In the present embodiment, the suspension tower 154 and the pressure receiving portion 122 of the electrical device unit casing 42, facing each other as described above, ensure shock resistance of the fuel cell unit 100 against impact including a component in the −X direction received due to collision of the vehicle 18 or the like.

Figure 14:
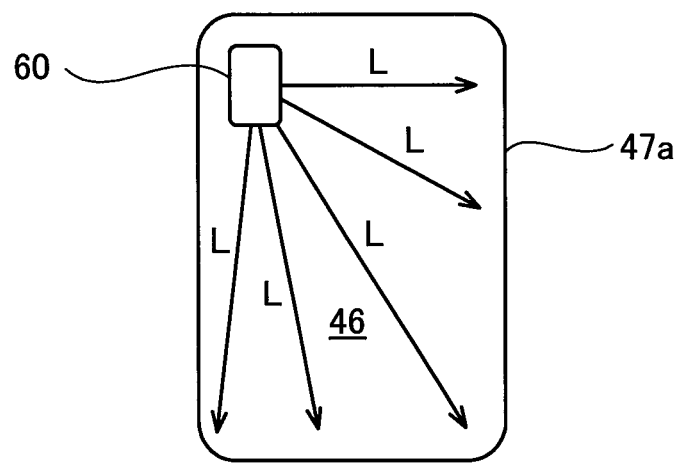
FIG. 14 is a schematic view of a partition wall not provided with a second communication hole.
Figure 15:
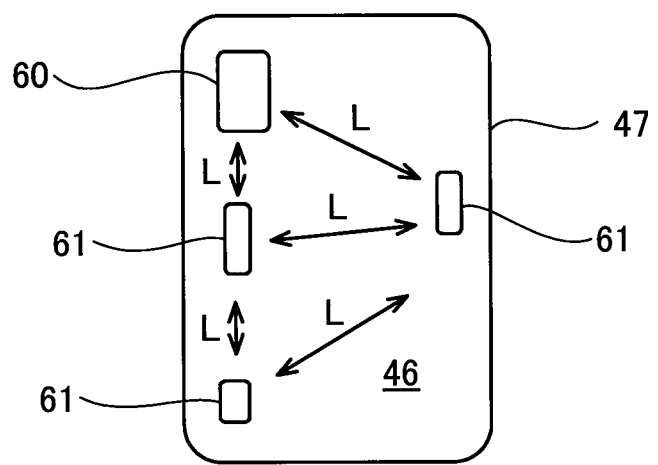
FIG. 15 is a schematic view of a partition wall provided with the second communication hole.

FIG. 14 is a schematic view of a partition wall 47a not provided with the second communication hole 61. FIG. 15 is a schematic view of the partition wall 47 according to the present embodiment provided with the second communication hole 61. In FIG. 14, the partition wall 47a is provided with the first communication hole 60 through which the harness 30 passes, but is not provided with the second communication hole 61. Thus, hydrogen might be leaked from the fuel cell stack 10 arranged in the first accommodation portion 45 and reach the second accommodation portion 46 through the first communication hole 60. Then, abnormal combustion of this hydrogen might occur to cause pressure rise in the second accommodation portion 46. When this happens, even the electrical device unit casing 42 with sufficient strength might deform. More specifically, with the partition wall 47a provided with the first communication hole 60 only, shock waves, as a result of the hydrogen combustion, cannot be released and thus travel for a long movement distance L, resulting in sharp pressure rise in a corner portion of the second accommodation portion 46.

In view of this, in the present embodiment, the partition wall 47 is provided with the second communication holes 61 in addition to the first communication hole 60 through which the harness 30 passes, as illustrated in FIG. 15. This ensures a shorter movement distance L of the shock waves as a result of the abnormal hydrogen combustion. Thus, the sharp pressure rise in the second accommodation portion 46 is limited, whereby the casing 40 is less likely to deform when the abnormal combustion of hydrogen occurs. In the present embodiment, in particular, the plurality of second communication holes 61 are provided so that a plurality of routes can be set for complex propagation of hydrogen due to a hydrogen ignited position and arrangement of parts in the electrical device unit casing 42. Thus, the movement distance L of the shock wave can be effectively shortened, whereby the sharp pressure rise in the second accommodation portion 46 can be prevented.

Furthermore, the present embodiment can prevent pressure rise in the second accommodation portion 46 due to the abnormal combustion of hydrogen with the second communication holes 61, and thus can prevent the casing 40 from deforming without providing a pressure release valve or additional reinforcement. Thus, reduction of a manufacturing cost for the fuel cell unit 100 can be achieved.

In the present embodiment, the partition wall 47 is provided with the first communication hole 60 through which the harness 30 passes and is further provided with the second communication holes 61. Thus, the amount of used materials can be reduced, whereby the weight can be prevented from increasing and the cost reduction can be achieved.

In the present embodiment, the controller 76 in the first accommodation portion 45 and the electrical device (externally power supplying unit 20) in the second accommodation portion 46 can be wired to each other through the first communication hole 60. This ensures that the casing 40 does not deform due to abnormal combustion of hydrogen, while ensuring a higher degree of freedom in the arrangement of parts in the casing 40.

In the present embodiment, the first communication hole 60 is provided in the end portion of the partition wall 47. This ensures a higher degree of freedom in the arrangement of parts on the upper surface or the lower surface of the partition wall 47.

In the present embodiment, the portion close to the center of the casing 40 includes a larger number of the second communication holes 61 than on the end portion of the casing 40, in the partition wall 47. This configuration involves a lower risk of having the resistance of the casing 40 against the impact from the end portion side compromised. More specifically, in the present embodiment, the end portion close to the pressure receiving portion 122 of the casing 40 includes a smaller number of the second communication holes 61 than on the portion close to the center of the casing 40. This ensures higher resistance against the impact on the pressure receiving portion 122.

B. Second Embodiment

Figure 16:
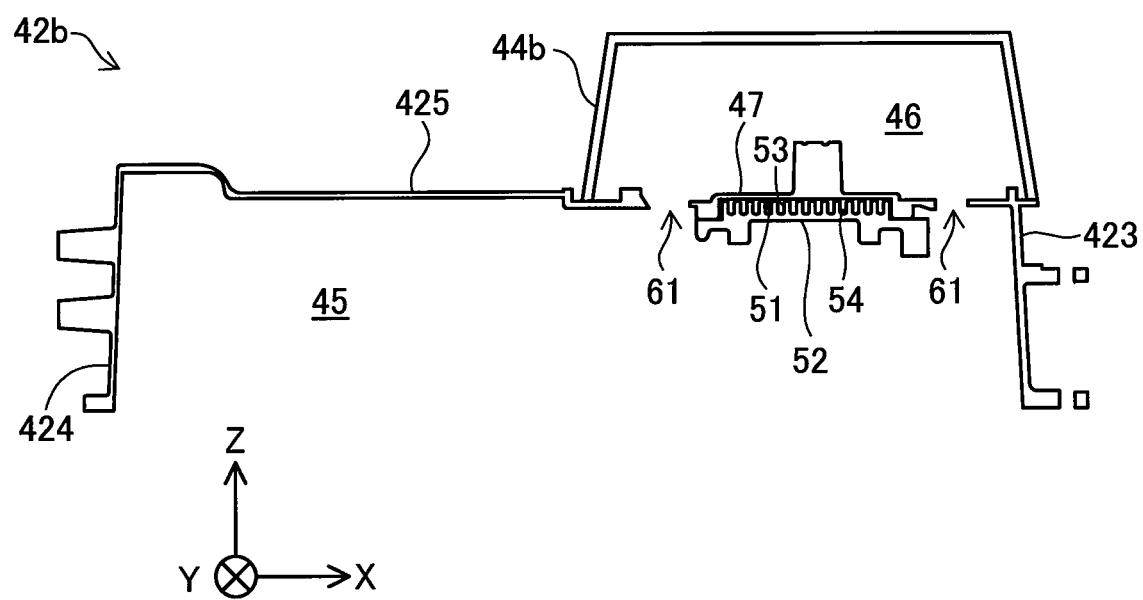
FIG. 16 is a cross-sectional view illustrating a configuration of an electrical device unit casing according to a second embodiment.

FIG. 16 is a cross-sectional view illustrating a configuration of an electrical device unit casing 42b according to a second embodiment. FIG. 16 is a diagram corresponding FIG. 10 in the first embodiment. In the figure, components that have the same functions as those described in the first embodiment are denoted with the same reference numerals. In the first embodiment, the second accommodation portion 46 is formed in the recess 43 formed in the upper wall 425 of the electrical device unit casing 42. In the second embodiment, the upper wall 425 of the electrical device unit casing 42b is substantially planer, and the second accommodation portion 46 is formed with a cover 44b, having an internal space, provided on the upper portion of the upper wall 425. Thus, in the present embodiment, the second accommodation portion 46 protrudes upward from the first accommodation portion 45. Also in this configuration, the partition wall 47 provided with the first communication hole 60 is further provided with the second communication holes 61. This ensures prevention of the sharp pressure rise in the second accommodation portion 46 due to the abnormal combustion of hydrogen that has flowed into the second accommodation portion 46, as in the first embodiment.

C. Other Embodiments

In the embodiments described above, the externally power supplying unit 20 and the controller 76 that controls the externally power supplying unit 20 are connected to each other via the harness 30 passing through the first communication hole 60. However, devices connected to each other via the harness 30 passing through the first communication hole 60 are not limited to these. For example, the harness 30 connected to the cell monitor 71 or the current sensor 73 may pass through the first communication hole 60 to be connected to an electrical device in the second accommodation portion 46.

In the embodiments described above, the first communication hole 60 and the second communication holes 61 are formed in the end portions of the partition wall 47. However, where the first communication hole 60 and the second communication holes 61 are formed is not limited to the end portions of the partition wall 47 and may be any position on the partition wall 47. In the embodiments described above, the partition wall 47 is provided with the three second communication holes 61. Alternatively, the number of the second communication hole 61 provided to the partition wall 47 may be one or may be four or more. In the embodiments described above, the partition wall 47 is provided with only one first communication hole 60. Alternatively, two or more first communication holes 60 may be provided.

In the embodiments described above, the connection wall 48 that establishes connection between the partition wall 47 and the top wall 426 may be formed as a part of the partition wall 47. Thus, for example, the first communication hole 60 and the second communication hole 61 may be formed in the connection wall 48 serving as the partition wall 47.

In the embodiments described above, the casing 40 includes the fuel cell stack casing 41 and the electrical device unit casing 42. However, the configuration of the casing 40 is not limited to this. For example, the casing 40 may be formed with a lid attached to a single casing.

The high-voltage device or the electrical device in the first accommodation portion 45 and the second accommodation portion 46 according to the embodiments described above may have any configuration. For example, the power control unit 130 illustrated in FIG. 13 may be partially or entirely arranged in the first accommodation portion 45 or the second accommodation portion 46. Each electrical device in the first accommodation portion 45 or the second accommodation portion 46 may be provided outside the fuel cell unit 100. The electrical devices in the first accommodation portion 45 and the electrical devices in the second accommodation portion 46 may be entirely or partially exchanged.

In the embodiments described above, the coolant flow path 54 is provided on the lower surface of the partition wall 47. The coolant flow path 54 may be provided on the upper surface of the partition wall 47, or any surface of the connection wall 48. When the amount of heat produced by the electrical devices in the casing 40 is small, the coolant flow path 54 may be omitted.

In the embodiments described above, the fuel cell unit 100 is arranged inside the front compartment 19 of the vehicle 18. However, the position where the fuel cell unit 100 is arranged in the vehicle 18 is not limited to this. For example, the fuel cell unit 100 may be arranged below the floor of the cabin 17, in a part of a trunk, or below the floor of the trunk.

In the embodiments described above, the fuel cell unit 100 is described as a unit installed in the vehicle. However, the fuel cell unit 100 is not limited to an in-vehicle unit, and may be installed in or outside a housing, an office, or a factory to serve as a power source.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the disclosure, there is provided a fuel cell unit. This fuel cell unit includes a fuel cell stack, an electrical device, a harness connected to the electrical device, and a casing incorporating the fuel cell stack, the electrical device, and the harness. The casing includes a first accommodation portion, a second accommodation portion, and a partition wall provided with a first communication hole through which the harness passes, the first accommodation portion accommodating the fuel cell stack, the second accommodation portion accommodating the electrical device, the partition wall partitioning the first accommodation portion and the second accommodation portion, and the partition wall is provided with at least one second communication hole through which the first accommodation portion and the second accommodation portion communicate with each other, in addition to the first communication hole. With the fuel cell unit according to this aspect, the partition wall is provided with the second communication hole in addition to the first communication hole. Thus, even when hydrogen is leaked from the fuel cell stack to flow into the second accommodation portion and then abnormal combustion of the hydrogen occurs, a movement distance of shock waves as a result of the combustion is short. As a result, sharp pressure rise in the second accommodation portion can be prevented, whereby the casing of the fuel cell unit is less likely to be deformed.

(2) In the fuel cell unit according to the above-described aspect, a controller may be configured to control the electrical device. The controller may be accommodated in the first accommodation portion. The harness may connect the controller and the electrical device with each other. Also with this fuel cell unit according to this aspect, the casing of the fuel cell unit is less likely to be deformed.

(3) In the fuel cell unit according to the above-described aspect, the first communication hole may be formed in an end portion of the partition wall. With the fuel cell unit according to this aspect, a higher degree of freedom can be achieved in terms of arrangement of components on the partition wall.

(4) In the fuel cell unit according to the above-described aspect, the partition wall may include a plurality of the second communication holes. A portion close to a center of the casing may include a larger number of the second communication holes than on an end portion of the casing, in the partition wall. With the fuel cell unit according to this aspect, resistance against impact from the end portion of the casing is less likely to be compromised.

The present disclosure can be implemented in various ways, and can be implemented in a fuel cell system, a vehicle, or the like including the fuel cell unit described above.

What is claimed is:

1. A fuel cell unit comprising:
a fuel cell stack including a plurality of fuel cells stacked, the plurality of fuel cells generating power upon receiving hydrogen and oxygen supplied;
an electrical device;
a harness connected to the electrical device; and
a casing incorporating the fuel cell stack, the electrical device, and the harness, wherein
the casing includes a first accommodation portion, a second accommodation portion, and a partition wall provided with a first communication hole through which the harness passes, the first accommodation portion accommodating the fuel cell stack, the second accommodation portion accommodating the electrical device, the partition wall partitioning the first accommodation portion and the second accommodation portion, and
the partition wall is provided with a plurality of second communication holes through which the first accommodation portion and the second accommodation portion communicate with each other, in addition to the first communication hole, the fuel cell unit further comprising:

a controller configured to control the electrical device,
wherein the controller is accommodated in the first accommodation portion, and the harness connects the controller and the electrical device with each other; and wherein
a portion close to a center of the casing in a predetermined direction includes a larger number of the second communication holes than on an end portion of the casing in the predetermined direction, in the partition wall,
a side wall positioned at the end portion of the casing has a pressure receiving portion protruding along the predetermined direction, the pressure receiving portion being configured to receive impact from outside of the fuel cell unit; and
wherein at least one of the second communication holes is provided on an end portion of the partition wall, close to or overlapping the pressure receiving portion.

2. The fuel cell unit according to claim 1, wherein
the first communication hole is formed in an end portion of the partition wall.

* * * * *